(12) United States Patent
Lata Perez et al.

(10) Patent No.: US 9,194,610 B2
(45) Date of Patent: Nov. 24, 2015

(54) SOLAR RECEIVER PANEL

(71) Applicant: SENER, INGENIERIA Y SISTEMAS, S.A., Las Arenas-GETXO (Vizcaya) (ES)

(72) Inventors: Jesus Maria Lata Perez, Bilbao (ES); Pedro Angel Bayon Sanz, Portugalete (ES)

(73) Assignee: SENER, INGENIERIA Y SISTEMAS, S.A., Las Arenas-Getxo, Vizcaya (ES)

( * ) Notice: Subject to any disclaimer, the term of this patent is extended or adjusted under 35 U.S.C. 154(b) by 368 days.

(21) Appl. No.: 13/759,992

(22) Filed: Feb. 5, 2013

(65) Prior Publication Data

US 2014/0216441 A1    Aug. 7, 2014

(51) Int. Cl.
*F24J 2/24*    (2006.01)
*F28F 9/02*    (2006.01)

(52) U.S. Cl.
CPC . *F24J 2/245* (2013.01); *F28F 9/02* (2013.01); *Y02E 10/44* (2013.01)

(58) Field of Classification Search
CPC ............... F24J 2/07; F24J 2/24; F24J 2/245; F24J 2/4647; F24J 2/4649; F28F 9/02; F28F 9/0263; F28F 21/083; F28F 21/087; Y02E 10/41; Y02E 10/44
See application file for complete search history.

(56) References Cited

U.S. PATENT DOCUMENTS 6,736,134 B2    5/2004 Marko
2009/0250051 A1    10/2009 Lata Perez

FOREIGN PATENT DOCUMENTS

ES    2 263 394 B1    11/2007
WO    WO 03/021159 A2    3/2003

*Primary Examiner* — Alfred Basichas
(74) *Attorney, Agent, or Firm* — Merchant & Gould P.C.

(57) ABSTRACT

A solar receiver panel comprising a header comprising header body (18, 18') having a header wall surrounding an inner chamber (11, 11'), at least one access opening (21, 21') communicating with the inner chamber (11, 11') with a substantially spherical shape for connecting a fluid pipe, and a plurality of junction nozzles (16, 16') provided in the header wall which are connectable to respective solar absorption pipes (14) wherein at least one of the junction nozzles (16, 16') are located in a spherical segment of the inner chamber (11, 11') that is transversally opposed to said access opening (21, 21'), been the access opening (21, 21'), inner chamber (11, 111 and nozzles (16, 16') arranged to allow a thermal fluid to flow there through.

10 Claims, 2 Drawing Sheets

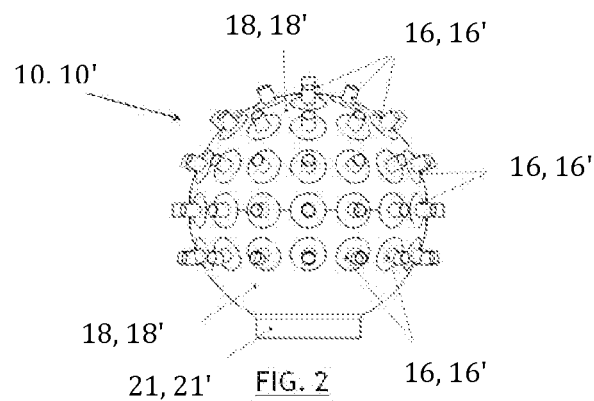
FIG. 2
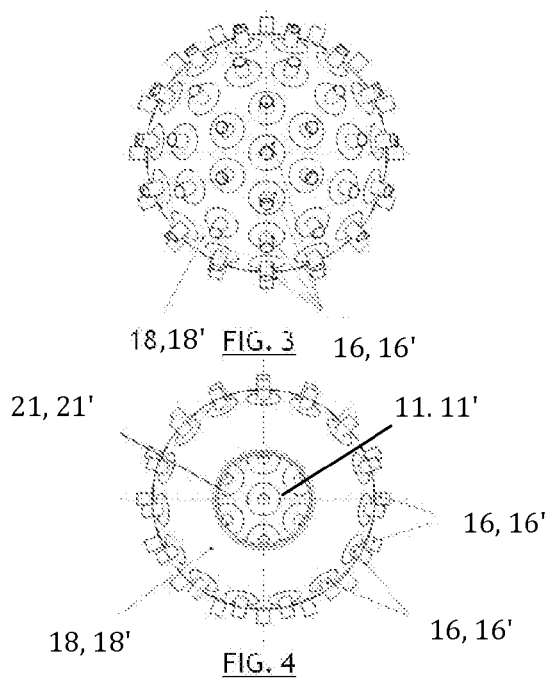
FIG. 3
FIG. 4
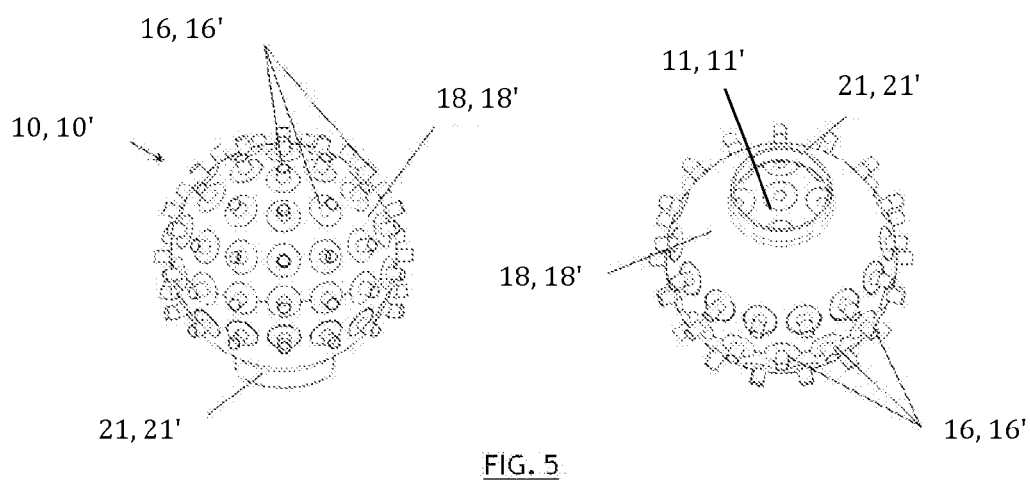
FIG. 5

SOLAR RECEIVER PANEL

TECHNICAL FIELD OF THE INVENTION

The present invention lies within the technical field of solar absorption panels comprising headers and, particularly relates to solar absorption panels comprising headers used to distribute and collect solar absorption pipes of a solar receiver panels, typically a molten-salt solar collector, although it is also applicable to absorption panels using other high-temperature transmitting fluids.

BACKGROUND OF THE INVENTION

Cylindrical thin-walled header with constant cross sections and thin-walled header with variable cross sections have been used in molten-salt receiving solar absorption panels, to which solar absorption pipes are connected by means of sleeves or nozzles that have previously been machined and subsequently welded. In some cases, the nozzles have been directly extruded from the collector. Such embodiments have been disclosed in U.S. Pat. No. 6,736,134-B2 and its counterpart WO 03/021159 A2, and in US2009/250051 A1 and its counterpart ES-2263394-B1, respectively.

Some of the constructions of this kind subject the areas that join the header body to the solar absorption pipes to high thermal strains. These thermal strains are caused by rapid temperature changes in the molten salts flowing through the header due to the passage of clouds over the heliostat field of a solar plant. These thermal strains due to abrupt temperature changes may be attenuated by placing jackets or other thermal protection at the nozzles that join the solar absorption pipes to the header. However, these protections have geometries which are complex regarding manufacturing and difficult to assemble. Without this protection operational lifetime of the plant is extremely short.

On the other hand, this header requires a minimum passage cross section so as to uniformly distribute the flow of salts or other transmission fluid through all solar absorption pipes connected to the header, at a lowest-possible pressure loss. It is however well know that flow of molten salt or transmission fluid is not uniform along the collector and that such variable flow distribution will depend on the arrangement of the connections on the header of the pipe or pipes feeding it and of the solar absorption pipes that distribute the salts or transmission fluid.

In cylindrical header having constant cross sections and fed basically by their central portions, speed of the transmission fluid becomes substantially reduced in the lateral areas as the fluid has been distributed through the solar absorption pipes that connect to the central portion of the header, thereby causing severe thermal strains in the nozzles that join the solar absorption pipes connecting with the collector's side portions.

This design involving a cylindrical header having a constant cross section does not optimize the combination of thermal strains generators by transiently-passing clouds with the mechanical strains that the header must also absorb as a container which stands under pressure in these portions that are remote from the collector's feeding pipes, therefore involving that its main body requires wall thicknesses that are larger than desired, which in turn again are adverse for the thermal strains as derived to the nozzles joining the header to the pipes.

In the design of headers having variables cross sections and thin walls, the goal is to provide an improved header design that is suitable to be used in solar receiver panels for molten salts or any other transmission fluid, by more efficiently stand the thermal strains experienced by the nozzles joining the header to the solar absorption pipes.

It is thus one main object of the present invention to provide a header design for use in molten-salt or other transmission fluid solar receiver panels which deals more effectively with the thermal strains experienced at the nozzles joining the header to the solar absorption pipes without the need for using complex and expensive thermal protection devices.

It is another object of the present invention to provide a header design for use in molten-salt or other transmission fluid solar receiver panels which allows using the same concept of a nozzle joining the header and solar absorption pipe, for all thereto-connected tubes including those areas of both high flow and low flow of salts or other fluids, of the header, thereby achieving the resulting advantages regarding manufacturing and costs.

SUMMARY OF THE INVENTION

The present invention is intended to comply with the afore mentioned objects by means of an absorption panel comprising a header.

The header for solar absorption panel pursuant to the invention comprises a header body having a header wall surrounding an inner chamber, at least one access opening communicating with the inner chamber for connecting a fluid pipe, and a plurality of junction nozzles provided in the header wall which are connectable to respective solar absorption pipes, the access opening, inner chamber and nozzles arranged to allow a thermal fluid to flow there through, characterized in that the inner chamber has a substantially spherical shape;

at least one of the junction nozzles are located in a spherical segment of the inner chamber that is transversally opposed to said access opening.

The term "thermal fluid" as used herein includes molten salts and other thermal transmission fluids which are known in the art.

Preferably, the header body of the panel also has substantially spherical shape, since typically solar panels are connected in series and therefore generate significant pressures on their collectors to ensure that the fluid flows to the desired flow rate. These pressures, arising from said fact, and tubes exposed to the outside, must be small to withstand the high thermal loads received and therefore require high wall thicknesses in the collector, which goes against thermal transients steps caused by clouds for example, governed by thermic differential inertia between the tubes (thin and with low mass) and the collector (heavy and with many mass). In this sense, both the spherical geometry of the manifold and size as small as possible equal or lower to 1.5 times the sum of the sections of the inner passages of the solar absorption tubes that are connected to the header, compatible with a uniform flow distribution, are fundamental to achieve a lasting collector what a plant with solar panels connected in series required which is over 30 years.

According to the invention, one or more of the junction nozzles can be formed by extrusion from the header wall, Alternatively, one or more of the junction nozzles may be independent elements fixed in holes in the header wall, for example by welding. Preferably, the junction nozzles are uniformly distributed in the header wall. On the other hand, the at least one access opening can be an access nozzle formed by extrusion from the header wall or, alternatively, an access nozzle fixed in an access hole in the header wall.

From a theoretical viewpoint, a sphere is the optimum shape for a recipient that has to stand inner pressure as a so-shaped contained may be made with a wall that is thinner than recipients having other shapes. A spherical shape thus leads to saving in material, inspections, and time in the manufacturing process. Further, it allows to substantially reduce the difference between the thickness of the wall of the header body and that of the walls of the absorbing pipes, so that thermal strain exerted on the there between located junction nozzles is optimized and the operational lifetime of the header is extended.

Suitable materials for making the header should be selected from those offering suitable properties at high temperatures e.g. above 600° C., such as high mechanical resistance, high resistance to temperature-originated stress, suitable resistance to corrosion under pressure and high temperature against thermal fluids such as molten salt as for instance nitrate salts or other thermal transmission fluids, low thermal expansion coefficient so that stresses originating from thermal deformations may be avoided or at least minimized, weldability, shapability and being a material that is in common use. Ni-based high performance alloys ('superalloys') such as INCONEL 625 or similar alloys are suitable candidates.

The junction nozzles may be formed, for example by extrusion from the material of the spherical body, or they may be separate elements made for example by pressing, extrusion or machining, which are inserted into holes made in the spherical body.

An important function of the header is providing a uniform distribution of the flows of thermal fluid to the solar absorption pipes with least possible pressure losses. To achieve this, it is advantageous that the sum of the sections of the inner passages of the solar absorption pipes is at least equal to the section of the inner passage of the input pipe that feeds the thermal fluid to the header or, when more than one input pipe is provided, to sum of the sections of the inner passages of the input pipes.

The maximum cross section of the header body which is in the maximum inner diameter of the sphere, should be the smallest possible cross section allowing to form the junction nozzles out of the material of the header body or, where applicable, allowing fitting and welding the junction nozzles into the header body, but it should be at least be equal 1.5 times the sum of the sections of the inner passages of the solar absorption tubes that are connected to the header. For reasons related to flow distribution, the diameter can be done smaller thanks to the spherical geometry, that favors the uniformity of pressures within the collector and therefore the uniformity of flow rate to all the tubes that it connects, with all the advantages that entails, which does not happen in a cylindrical collector in which the diameter reduction is limited to obtain flow distribution as uniform as possible between all the connecting tubes so that it unable to further reduce its diameter.

The spherical header according to this invention provides a number of advantages over conventional cylindrical header having constant or varying cross sections.

The spherical header improves the uniformity of the distribution of the flow of thermal fluid through the thereto connected solar absorption pipes so that thermal stresses generated upon the occurrence of transitory changes in the junction nozzles joining the header with the solar absorption pipes is reduced, so that mechanical tensions due to pressure in the corresponding areas are reduced as a consequence of the reduction of the cross section of the passage as less tension are caused at an otherwise equal pressure load. In turn, this involves further relevant advantages such as the possibility of using thinner header walls for the header body which enable the header to better stand the severe thermal stresses in the areas where the header is joined to the input or output pipe and to junction nozzles to which the solar absorption pipes are connected, during the transitory passage of clouds over the heliostat field of the solar plant where the header is used.

Another advantage of the header of the present invention is that the same junction nozzle concept may be used for all solar absorption pipes connected to the header may be used. This results in advantages such as less complex and less expensive manufacturing and in that the use, manufacture and assembly of complex designs and expensive thermal protection devices for the nozzles located on low-fluid-flow areas of the thermal fluid may be dispensed with.

Generally speaking, the larger the header of the present invention has to be due to the need of connecting large numbers of solar absorption pipes, the more advantageous is its use, as it requires a wall thickness that is smaller than that needed in conventional headers and is therefore better suited regarding the thin walls of the solar absorption tube it connects to. This results in less temperature gradients and thus to less thermal stress in the areas of the junction nozzles caused by transitory temperature changes in the thermal fluid produced by the passage of clouds, so that the operational lifetime is increased substantially.

The solar receiver panel comprises a first header with an inlet for a thermal fluid a second header with an outlet for the thermal fluid, and a plurality of solar absorption pipes connected to said headers wherein at least one of the headers, preferably both, is a header as described above.

BRIEF DESCRIPTION OF THE DRAWINGS

Hereinafter, aspects of the invention will be described on the grounds of drawings wherein

FIG. 2 is a side view of a header present in the panel shown in FIG. 1;

FIG. 3 is a top plan view of the header shown in FIG. 2;

FIG. 4 is a bottom plan view of the header shown in FIGS. 2 and 3;

FIG. 5 shows top and bottom perspectives of another embodiment of a spherical header having a plurality of nozzles.

DETAILED DESCRIPTION OF THE INVENTION

Figure 1:
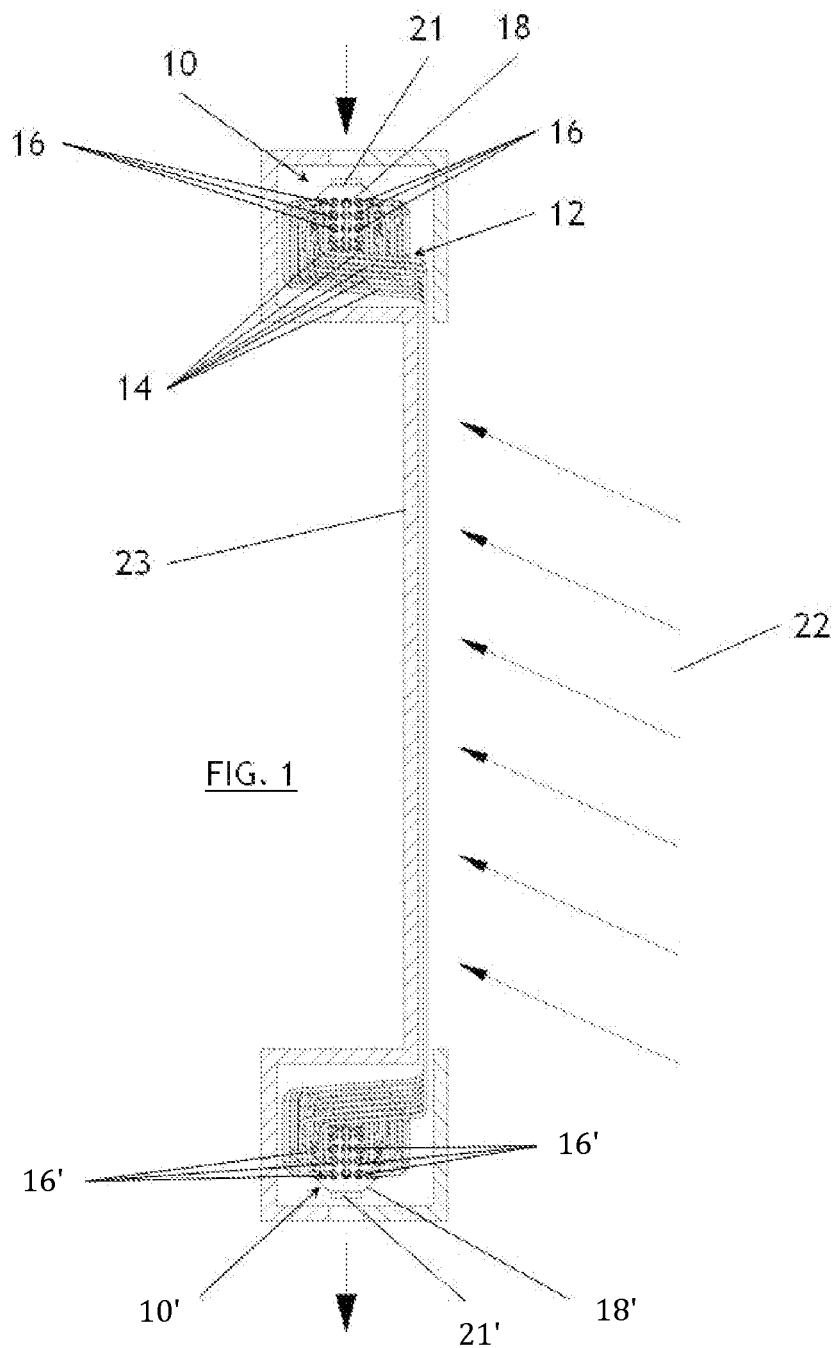
FIG. 1 is a partially sectioned schematic view of a solar absorption panel pertaining to a central solar receiver provided with headers according to an embodiment of the invention.

FIG. 1 shows a solar receiver panel—12—comprised of a plurality of parallel solar absorption pipes —14—the respective ends of which are connected to hollow spherical main bodies—18, 18'—of headers —10, 10'—by means of respective junction nozzles—16, 16'—.

Preferably, the ends of the pipes—14—are joined to the junction nozzles—16, 16'—by welding, and more preferably by butt welding. To a large proportion, the reliability of the header—10, 10'—is conditioned by said welds, to that automated welding is preferred.

An input flow of molten salt or other transmission fluid enters into the solar absorption panel—12—through a first opening—21—e.g. an inlet nozzle of the hollow spherical body—18—where the flow is distributed by means of the nozzles—16—into the various pipes—14—. The thus split flows pass through absorption pipes—14—towards the nozzles—16'—of the hollow spherical body—18'—of a second header—10'—where the split flows are collected into one output flow which leaves the second spherical body—10'—through opening—21'—e.g. an outlet nozzle. The split flows absorb heat energy of solar radiation—22—coming from a heliostat field (not shown in the drawings) reflected onto pipes—14—so that the molten salt or other transmission fluid is heated up. A per se conventional thermal protection—23—is provided to improve the thermal efficiency of the solar absorption panel—12—. The thermal protection—23—isolates the adsorption panel—12—and header—10, 10'—except in the area of the side of the solar absorption pipes—14—which receives reflected solar radiation—22—.

FIGS. 2, 3 and 4 show a preferred embodiment of a spherical header—10, 10'—according to this invention, where the spherical main body—18, 18'—has varying cross section. In this embodiment, opening i.e. the inlet or outlet nozzle—21, 21'—and/or junction nozzles—16—are preferably extruded directly from the main body—18, 18'—.

FIG. 5 shows an embodiment of the spherical header—10, 10'—where nozzle—21, 21'; 16, 16'—are separately made elements that have been inserted into previously made holes in the spherical main body—18, 18—and welded thereto.

The invention claimed is:

1. A solar receiver panel comprising a first header with an inlet for a thermal fluid, a second header with an outlet for the thermal fluid, and a plurality of solar absorption pipes connected to said headers, at least one of the headers is a header comprising a header body comprising:

a header wall surrounding an inner chamber with a substantially spherical shape with a maximum cross section that is equal or lower to 1.5 times the sum of sections of inner passages of the solar absorption tubes to be connected to junction nozzles, at least one access opening communicating with the inner chamber for connecting a fluid pipe, and the junction nozzles being provided in the header wall connectable to respective solar absorption pipes, wherein at least one of the junction nozzles is located in a semi-spherical segment of the inner chamber transversally opposed to said access opening, the access opening, inner chamber and nozzles being arranged to allow a thermal fluid to flow there through.

2. A solar receiver panel according to claim 1, wherein the header body has an outer substantially spherical shape.

3. A solar receiver panel according to claim 1, wherein at least some of the junction nozzles are formed by extrusion from the header wall.

4. A solar receiver panel according to claim 1, wherein at least some of the junction nozzles are independent elements fixed in holes in the header wall.

5. A solar receiver panel, according to claim 4, wherein the junction nozzles are fixed by welding.

6. A solar receiver panel according to claim 1, wherein at least one access opening is an access nozzle formed by extrusion from the header wall.

7. A solar receiver panel according to claim 1, wherein the at least one access opening is an access nozzle fixed in an access hole in the header wall.

8. A solar receiver panel according to claim 1, comprising one single access opening and the sum of the sections of the inner passages of the solar absorption pipes is at least equal to the section of the inner passage of the fluid pipe to be connected to the access opening.

9. A solar receiver panel according to claim 1, comprising at least two access openings and the sum of the sections of the inner passages of the solar absorption pipes is at least equal to the sum of the sections of the inner passage of the fluid pipe to be connected to the access opening.

10. A solar receiver panel according to claim 1, wherein the junction nozzles are uniformly distributed in the header wall.

* * * * *